(12) United States Patent
Montanari et al.

(10) Patent No.: US 8,356,516 B2
(45) Date of Patent: *Jan. 22, 2013

(54) BALANCING MACHINE FOR BALANCING VEHICLE WHEELS

(75) Inventors: Marco Montanari, Campegine (IT);
Roberto Nicolini, Rio Saliceto (IT)

(73) Assignee: Sicam S.R.L., Correggio (RE) (IT)

( * ) Notice: Subject to any disclaimer, the term of this patent is extended or adjusted under 35 U.S.C. 154(b) by 568 days.

This patent is subject to a terminal disclaimer.

(21) Appl. No.: 12/585,253

(22) Filed: Sep. 10, 2009

(65) Prior Publication Data

US 2010/0139396 A1 Jun. 10, 2010

(30) Foreign Application Priority Data

Dec. 9, 2008 (IT) .............................. MO2008A0230

(51) Int. Cl.
G01M 1/08 (2006.01)
G01D 7/00 (2006.01)

(52) U.S. Cl. ........................................ 73/462; 73/866.3

(58) Field of Classification Search .................... 73/460, 73/462, 468, 866.3
See application file for complete search history.

(56) References Cited

U.S. PATENT DOCUMENTS

| | | | | |
|---|---|---|---|---|
| 4,154,112 A * | 5/1979 | Hofmann | ......................... | 73/462 |
| 4,336,715 A * | 6/1982 | Arnold et al. | .................... | 73/462 |
| 4,348,885 A * | 9/1982 | Mueller | .......................... | 73/1.14 |
| 4,489,607 A * | 12/1984 | Park | .................................. | 73/462 |
| 4,535,411 A * | 8/1985 | Blackburn et al. | ............. | 700/279 |
| 4,817,003 A * | 3/1989 | Nagase et al. | ................. | 701/124 |
| 4,958,290 A * | 9/1990 | Kendall et al. | ................... | 73/460 |
| 5,046,361 A * | 9/1991 | Sandstrom | ....................... | 73/460 |
| 5,311,777 A * | 5/1994 | Cunningham et al. | .......... | 73/462 |
| 5,412,583 A * | 5/1995 | Cameron et al. | ............... | 700/279 |
| 5,544,073 A * | 8/1996 | Piety et al. | ..................... | 700/279 |
| 5,915,274 A * | 6/1999 | Douglas | ........................... | 73/462 |
| 5,969,247 A * | 10/1999 | Carter et al. | .................... | 73/462 |
| 6,269,688 B1 | 8/2001 | Kroll et al. | | |
| 6,715,351 B1 * | 4/2004 | Feero et al. | ...................... | 73/462 |
| 6,907,781 B2 * | 6/2005 | Racine | ............................ | 73/462 |
| 7,191,650 B2 * | 3/2007 | Cunningham et al. | .......... | 73/462 |
| D555,148 S * | 11/2007 | Mittersinker et al. | ........ | D14/217 |
| 7,312,785 B2 * | 12/2007 | Tsuk et al. | ..................... | 345/156 |
| 2003/0088346 A1 | 5/2003 | Calkins et al. | | |
| 2006/0042380 A1 | 3/2006 | Douglas et al. | | |
| 2007/0069571 A1 | 3/2007 | Matteucci et al. | | |
| 2008/0053223 A1 | 3/2008 | Montanari | | |
| 2009/0145221 A1 | 6/2009 | Montanari et al. | | |

* cited by examiner

*Primary Examiner* — Helen C. Kwok
(74) *Attorney, Agent, or Firm* — Stein McEwen, LLP

(57) ABSTRACT

The balancing machine for balancing vehicle wheels comprises a supporting structure for supporting grip and rotation members for gripping and rotating a wheel to be balanced, a detector for detecting the unbalance of the wheel during rotation, a processing unit which is operatively associated with the grip and rotation members and with the detector, and interface assembly associated with the supporting structure and operatively associated with the processing unit. The interface assembly comprises a support associated to the supporting structure, a screen housed internally of a first housing on the support and a keyboard housed internally of a second housing on the support.

13 Claims, 1 Drawing Sheet

BALANCING MACHINE FOR BALANCING VEHICLE WHEELS

The present invention relates to a balancing machine for balancing vehicle wheels.

BACKGROUND OF THE INVENTION

It is known that vehicle wheels are, generally, made up of a cylindrical metal rim having, at the axial extremities, annular flanges between which is defined a slot-in fitting channel for an elastic tire, the side portions of which, so-called "beads", are blocked up firmly against the annular flanges themselves.

The need is also known to carry out frequent balancing operations which consist of fitting weights, made of lead or other material, at predetermined points of the wheel and along the rim.

During wheel rotation, the fitting of the weights offsets the presence of any tire and/or rim irregularities.

To carry out such operations, balancing machines are commonly used that comprise a supporting structure for wheel grip and rotation means, of the type of a horizontal shaft that can be turned axially by means of the operation of motor means and on which the wheel rim is keyed.

The measurement of wheel unbalance is determined during rotation by means of suitable electronic or electro-mechanical devices, such as force transducers fitted along the horizontal shaft.

To the unbalance measurement are normally added other characteristic measurements, such as wheel roundness measurement, wheel eccentricity, amount of tread wear, etc., normally made by means of suitable measuring sensors with or without contact (e.g., feelers or optic sensors).

It is also known that such balancing machines have suitable interface means suitable for allowing interaction with the machine, by an operator during unbalance measuring operations and during the subsequent balancing operations.

Such interface means are linked to the balancing machine electronics and allow the interaction between the operator and the machine control software.

The interface means generally comprise a monitor fixed to the supporting structure of the machine and suitable for displaying information relating to unbalance measurements and information to guide the operator during the balancing operations.

The interface means also comprise a keyboard with a plurality of keys that can be used by the operator to modify the measuring settings before determining the unbalance, or to allow the operator to display and manage the collected data, after determining the unbalance.

Known balancing machines are disclosed in U.S. Patent Application Publication No. 2007/0065971 A1, published Mar. 27, 2009. U.S. Patent Application Publication No. 2008/0053223 A1, published Mar. 6, 2008, and U.S. Patent Application Publication No. 2009/0145221A1, published Jun. 11, 2009.

These known balancing machines however do have some drawbacks.

A monitor, however compact and of reduced dimensions, nevertheless has fairly large overall dimensions and calls for the supporting structure to be suitably prepared for its installation in an easy-to-reach position visible to the appointed operator. Furthermore, during the balancing machine assembly stage, both the monitor and the keyboard must be fixed to the supporting structure and connected to the machine electronics using special wires, which consequently requires a fairly long time.

BRIEF SUMMARY OF THE INVENTION

The main aim of the present invention is to provide a balancing machine for balancing vehicle wheels in which the interface means are easy to use and accessible to an operator.

Another object of the present invention is to provide a balancing machine for balancing vehicle wheels in which the interface means are installable in a simple and quick way during the assembly operations of the machine itself.

Another object of the present invention is to provide a balancing machine for balancing vehicle wheels overcomes the mentioned drawbacks of the background art in the ambit of a simple, rational, easy, effective to use and low cost solution.

The above-described objects are achieved by the present balancing machine for balancing vehicle wheels, comprising a supporting structure for supporting grip and rotation means for gripping and rotating a wheel to be balanced, detection means for detecting the unbalance of the wheel during rotation, at least a processing unit which is operatively associated to said grip and rotation means and to said detection means, and interface means associated to said supporting structure and operatively associated to said processing unit, wherein said interface means comprise a support associated to said supporting structure, at least a screen housed internally of a first housing on said support and at least a keyboard housed internally of a second housing on said support.

Other characteristics and advantages of the present invention will become more evident from the description of a preferred, but not sole, embodiment of a balancing machine for balancing vehicle wheels, illustrated purely as an example but not limited to the annexed drawings in which:

DETAILED DESCRIPTION OF THE INVENTION

Figure 1:
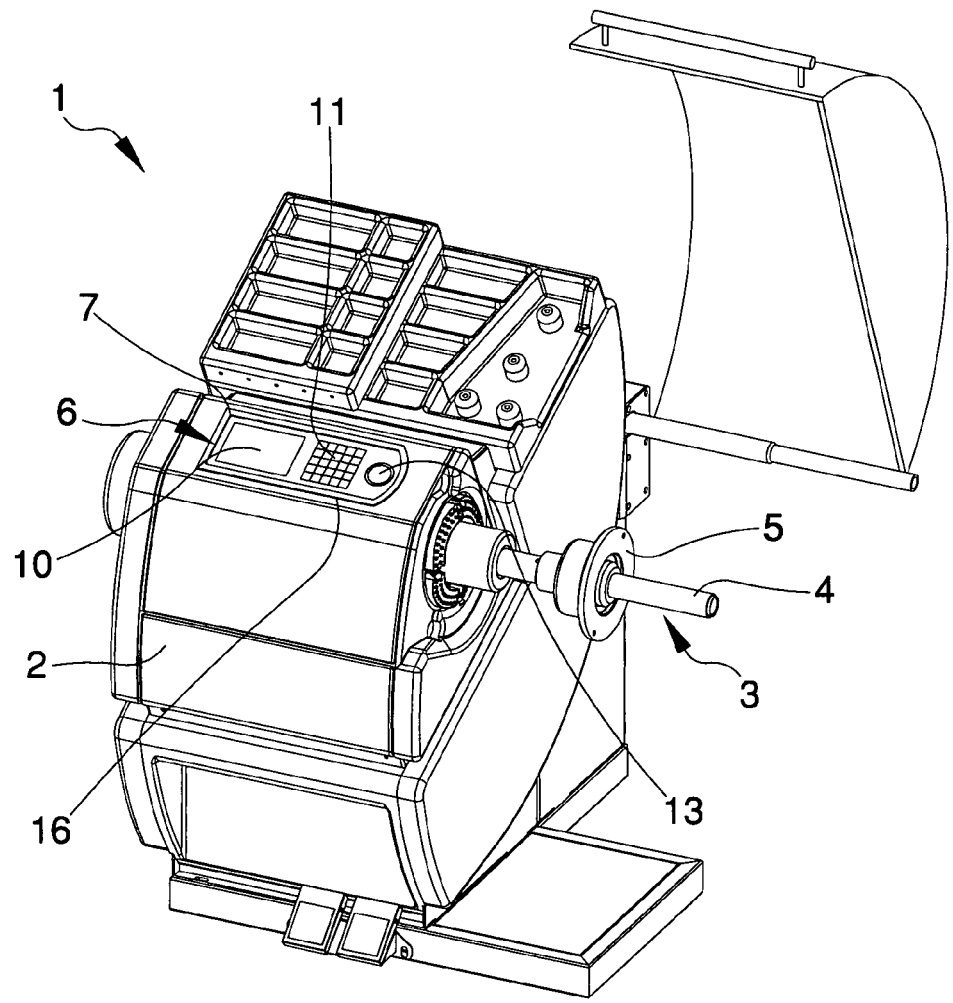
FIG. 1 is an axonometric view of the balancing machine according to the invention.
Figure 2:
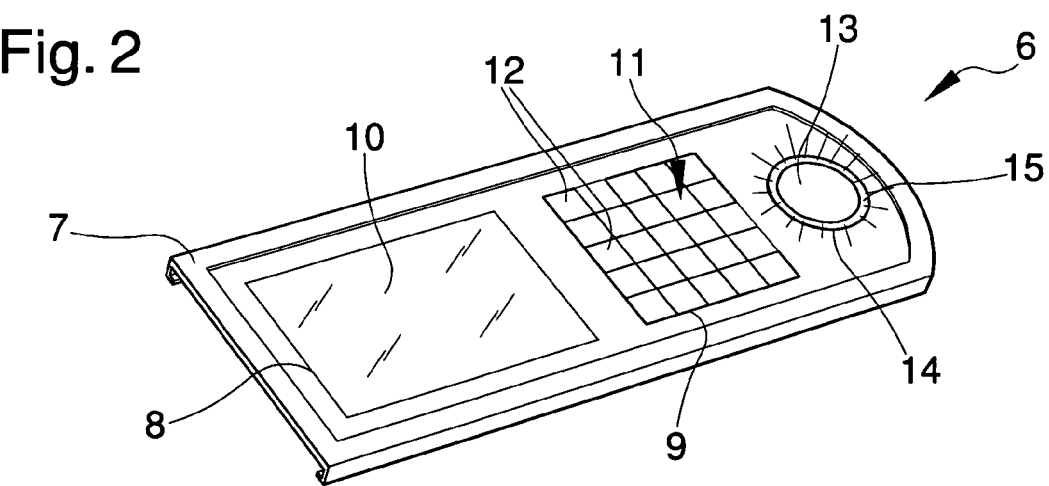
FIG. 2 is an axonometric view of the interface means of the balancing machine according to the invention.

With reference to such figures, by 1 is globally indicated a balancing machine for balancing vehicle wheels.

The machine 1 comprises a supporting structure 2 which supports grip and rotation means 3 for gripping and rotating a wheel to be balanced around a substantially horizontal rotation axis.

In particular, the supporting structure 2 contains motor means of the type of an electric motor or the like to operate the grip and rotation means 3.

The grip and rotation means 3, in particular, comprise a shaft 4 that protrudes horizontally and overhanging from the supporting structure 2. The free extremity of the shaft 4 has a bushing 5 able to fix and center the rim of the wheel to be balanced.

The machine 1 also comprises detection means (not shown in FIG. 1 because they are of known type) suitable for detecting the unbalance of the wheel to be balanced fitted on the shaft 4 during the rotation of same.

In particular, such detection means can comprise one or more force transducers, such as load cells or the like, associated along a section of the shaft 4 and suitable for detecting changes in the forces exercised by the wheel along the shaft 4 itself during rotation.

The machine 1 cannot include further detection means, composed of sensors of the type with or without contact such as feelers, optical sensors or laser distance sensors, suitable for detecting, e.g., the profile of the wheel.

The machine 1 furthermore comprises a processing unit, such as a microprocessor system or the like, operatively associated with grip and rotation means 3 and with the detection means. Such processing unit is suitable for piloting the rotation of the shaft 4 and for storing and processing the measurements collected by means of the above detection means.

The machine 1 has interface means, generally indicated by the reference 6, associated with the supporting structure 2, operatively associated with the processing unit and suitable for allowing the interaction of an operator appointed to perform balancing with the machine 1.

Advantageously, the interface means 6, or interface assembly, comprise a support 7 fixed to the supporting structure 2 and having a first housing 8 and a second housing 9 suitable for mounting a screen 10 and a keyboard 11 respectively.

Usefully, the support 7 has a substantially plate-shaped and widened conformation, and the screen 10 and keyboard 11 are arranged side by side. In particular, the screen 10 is of the type of a flat LCD (Liquid Crystal Display) screen and the keyboard 11 is a discrete touch capacitive technology keyboard.

It must be pointed out that, in the present description, by "discrete keyboard" is meant a keyboard comprising a plurality of keys 12, distinct one from the other, and separated, which correspond to distinct functions or alphanumeric characters. Usefully, the interface means 6 comprise a further bi-functional button 13, with a substantially round profile, mounted in a third housing 14 of the support 7.

The button 13 is operatively associated with the above processing unit and is suitable for piloting, or controlling, the start and stop of the wheel unbalance detection means and, therefore, for starting/stopping the wheel unbalance (or else) data collection and processing processes.

Similarly to the keyboard 11, the button 13 can also be of the capacitive technology touch button type.

Usefully, with particular and sole reference to the embodiment shown in the illustrations, the support 7 is substantially rectangular and widened horizontally, and the screen 10, the keyboard 11 and the button 13 are arranged horizontally side by side, from left to right with respect to the normal work position of an appointed operator during the unbalance measuring operations.

Usefully, the interface means 6 have a light indicator 15 suitable for indicating the start and stop condition of the detection means and, therefore, of the wheel unbalance measurement and processing operations.

In particular, the light indicator 15 comprises a plurality of LEDs arranged in ring conformation along the perimeter of the button 13 and suitable for changing colour according to the start and stop condition of the unbalance measurement operations. Advantageously, the interface means 6 comprise an electric connector, not shown in the illustrations, fixed to the rear of the support 7 and suitable for electronically connecting the screen 10, the keyboard 11 and the button 13 to the processing unit and to the power circuit of the machine 1.

The support 7 is fixed inside a suitable seat 16 on the supporting structure 2, defined at a front and upper portion so as to allow easy access to the keyboard 11 and the button 13 and a perfect view of the screen 10 by an operator appointed to perform balancing.

Usefully, such seat 16 is shaped to completely reproduce the profile of the support 7, so as to allow the measured fitting of the support 7 itself which, therefore, appears visually fully integrated with the rest of the supporting structure 2.

It has in point of fact been ascertained how the described invention achieves the proposed objects, and in particular, the fact is underlined that the integrated manufacture of the screen and the keyboard on a single support, and therefore their close arrangement, make the interface means easily usable and accessible for an operator appointed to perform balancing.

Furthermore, the interface means described above, being made on a single compact and easy-to-handle support, fittable in a specific seat on the supporting structure, are easily and quickly installable during the balancing machine assembly operations.

What is claimed is:

1. A balancing machine for balancing vehicle wheels, comprising a supporting structure for supporting grip and rotation means for gripping and rotating a wheel to be balanced, detection means for detecting the unbalance of the wheel during rotation, at least a processing unit which is operatively associated to said grip and rotation means and to said detection means, and interface assembly associated with said supporting structure and operatively associated with said processing unit, wherein said interface assembly comprises a support associated with said supporting structure, at least a screen housed internally of a first housing on said support and at least a keyboard housed internally of a second housing on said support, said support being substantially plate-shaped, said supporting structure comprises at least a seat for housing said support, and said seat is shaped to reproduce at least in part the profile of said support.

2. The machine according to the claim 1, wherein said screen and said keyboard are arranged side by side.

3. The machine according to claim 1, wherein said keyboard is of a discrete keyboard type.

4. The machine according to claim 1, wherein said keyboard is of a touch keyboard type.

5. The machine according to claim 1, wherein said screen is of an LCD (Liquid Crystal Display) screen type.

6. The machine according to claim 1, wherein said interface means comprise at least a button housed internally of a third housing on said support, said button being operatively associated to said processing unit and adapted to pilot the start and the stop of said detection means for detecting the wheel unbalance.

7. The machine according to claim 6, wherein said button is of a touch button type.

8. The machine according to claim 6, wherein said screen, said keyboard and said button are arranged side by side.

9. The machine according to claim 6, wherein said interface means comprise at least a light indicator for indicating the start or stop condition of said detection means for detecting the wheel unbalance.

10. The machine according to claim 9, wherein said light indicator comprises a plurality of LEDs arranged along at least a section of the perimeter of said button.

11. The machine according to claim 1, wherein said interface means comprise at least an electrical connector associated to said support and electronically associated to said processing unit and to at least one of said screen and said keyboard.

12. The machine according to claim 6, wherein said interface means comprise at least an electrical connector associated to said support and electronically associated to said processing unit and to said button.

13. The machine according to claim 1, wherein said seat is defined at a front upper portion of said supporting structure.

* * * * *